United States Patent [19]
Fryer et al.

[15] 3,681,360
[45] Aug. 1, 1972

[54] ANTIVIRAL SUBSTITUTED ACRIDANONES
[72] Inventors: Rodyen Ian Fryer; Emenuel Grunberg, both of North Caldwell, N.J.
[73] Assignee: Hoffmann-La Roche Inc., Nutley, N.J.
[22] Filed: April 9, 1971
[21] Appl. No.: 132,819

[52] U.S. Cl..............260/279 R, 260/578, 424/257
[51] Int. Cl. .............................................C07d 37/20
[58] Field of Search.................................260/279 R

[56] References Cited

UNITED STATES PATENTS

| | | | |
|---|---|---|---|
| 2,989,540 | 6/1961 | Staeble | 260/279 R |
| 3,072,485 | 1/1903 | Reynolds | 260/279 X |
| 3,188,164 | 6/1965 | Dean | 260/279 R |
| 3,452,021 | 6/1969 | Meisels | 260/279 R |
| 3,485,844 | 12/1969 | Kaiser | 260/279 R |
| 3,539,574 | 11/1970 | Sheehan | 260/279 R |
| 3,624,255 | 11/1971 | Burdeska | 260/279 R |
| 2,623,046 | 12/1952 | Cusic | 260/279 R |
| 2,709,171 | 5/1955 | Stoughton | 260/279 R |

FOREIGN PATENTS OR APPLICATIONS

| | | | |
|---|---|---|---|
| 426,821 | 6/1967 | Switzerland | 260/279 |
| 467,263 | 2/1969 | Switzerland | 260/279 |

*Primary Examiner*—Donald G. Daus
*Attorney*—Samuel L. Welt, Bernard S. Leon, Jon S. Saxe, Gerald S. Rosen, R. Hain Swope and William M. Farley

[57] ABSTRACT 10 alkyl carbonylic substituted acridanones and a method for their preparation. The compounds are chemotherapeutically useful as antiviral agents.

6 Claims, No Drawings

ANTIVIRAL SUBSTITUTED ACRIDANONES

BRIEF SUMMARY OF THE INVENTION

The present invention is concerned with certain substituted acridanones which are characterized by antiviral activity and are represented by the general formula

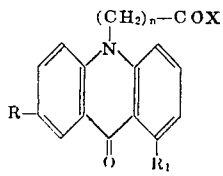

wherein R is selected from the group consisting of hydrogen, halogen and nitro, $R_1$ is hydrogen or halogen and X is selected from the group consisting of $OR_2$ and $-NR_3R_4$ wherein each of $R_2$, $R_3$ and $R_4$ is hydrogen or lower alkyl and $n$ is 1 to 4, and where X is OH, pharmaceutically acceptable salts thereof.

DETAILED DESCRIPTION OF THE INVENTION

The present invention is directed to certain novel acridanones represented by the general formula

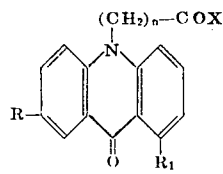

wherein R is selected from the group consisting of hydrogen, halogen and nitro, $R_1$ is hydrogen or halogen and X is selected from the group consisting of $OR_2$ and $-NR_3R_4$ wherein each of $R_2$, $R_3$ and $R_4$ is hydrogen or lower alkyl and $n$ is 1 to 4, and where X is OH, pharmaceutically acceptable salts thereof.

In a more particular aspect, the invention is concerned with novel acridanones of the above formula wherein R is selected from the group consisting of hydrogen and chloro, $R_1$ is selected from the group consisting of hydrogen and fluoro, and X is selected from the group consisting of hydroxy and amino and, where X is hydroxy, pharmaceutically acceptable salts thereof.

An especially preferred class, because of the superior antiviral activity of the members thereof, (especially against Columbia SK, herpes and Coxsackie B1 viruses), is that represented by the formula

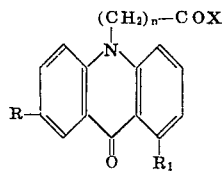

wherein R is selected from the group consisting of hydrogen and chloro, $R_1$ is hydrogen, X is hydroxy or amino and $n$ is 1 to 3, and where X is hydroxy, pharmaceutically acceptable salts.

By the term "lower alkyl" is meant a straight or branched chain alkyl radical having from one to six carbons inclusive such as, for example, methyl, ethyl, propyl, isopropyl, butyl, sec.-butyl, tert.-butyl and the like. Preferred lower alkyl radicals are those having from one to three carbon atoms inclusive, with methyl being especially preferred. By "halogen" is meant all four halogens.

The novel compounds of the present invention may be utilized, where available, in the form of their pharmaceutically acceptable salts for purposes such as solubilization and the like. Such salts include, for example, where X in the preceding formulas is OH, salts with alkali metals or alkaline earth metals. Preferred among these salts are sodium salts. In the compounding of pharmaceutical dosage forms, an amount of the salt equivalent to the desired quantity of free base is always utilized in accordance with the art of pharmaceutical compounding.

The acridanone compounds of the subject invention may be prepared by ring closure of certain substituted benzophenones, i.e., 2'-amino-2'-fluorobenzophenones. While temperature is not a critical factor in this reaction and cyclization can be carried out at room temperature, the procedure is preferably carried out by refluxing a solution of the benzophenone in a suitable inert organic solvent. Examples of suitable solvents include benzene, 2-ethoxyethanol, DMSO and the like. Particularly preferred solvents are those known to promote nucleophilic exchange, e.g., N,N-dimethylformamide, dimethylsulfoxide (DMSO), hexamethylphosphoramide, and the like. Although not an absolute requirement, it is preferred to carry out the reaction in the presence of a suitable base which acts as an acid acceptor. Suitable bases include organic bases such as, for example, pyridine and triethylamine and inorganic bases such as, for example, alkali metal hydroxides, bicarbonates and carbonates. Such bases, when utilized, are present in at least a molar equivalent amount.

An N-carboxylic acid ester substituent is then introduced into the resulting acridanone by formation of an N-alkali metal derivative, followed by reaction with a haloester of a lower alkanoic acid such as, for example, ethyl bromoacetate. The first reaction is carried out by reacting the acridanone with an alkali metal hydride or alkoxide such as sodium methoxide in an inert organic solvent such as, for example, benzene, toluene, dimethylformamide, DMSO and the like. Temperature in the first step is not particularly critical but preferably is in the range of from about −10° to about 30° C. The temperature for the second step is also not critical but is preferably in the range of from about 35° to about 100° C.

The N-ester substituted acridanone compounds thus formed may be converted to the carboxylic acid form by standard hydrolysis techniques, e.g., heating with an alkali metal hydroxide in a suitable inert solvent, e.g., ethyl alcohol.

The N-carboxylic ester or acid substituted compounds may then be converted to the corresponding amide or substituted amide by conventional methods, e.g., reaction of the ester or acid chloride with ammonia or a primary or secondary amine, such as, for example, methyl amine, diethylamine, piperidine, morpholine and the like. The preferred reactant is ammonia.

As an alternative procedure, the desired N-substituent may be introduced into the benzophenone by conventional alkylation techniques. If necessary, modifications of the side chain, i.e., acid and amide formation, may then be carried out as described above. The resulting N-substituted benzophenone is cyclized directly to the corresponding acridanone as described above.

The acridanones of the present invention are useful as antiviral agents, being particularly active against the encephalomyocarditis virus Columbia SK, Coxsackie virus B1 and the herpes virus. These compounds may be administered internally, either parenterally or enterally, in the form of pharmaceutical preparations well recognized in the art. In such preparations the active compounds of the invention or their pharmaceutically acceptable salts are admixed with suitable pharmaceutically acceptable inert carrier materials such as, for example, water, gelatin, lactose, starch, magnesium stearate, talc, vegetable oils, gums, polyethylene glycol, petroleum jelly and the like. Such pharmaceutical preparations may be solid dosage forms such as, tablets, capsules, lozenges, dragees or the like; liquids such as emulsions, syrups, solutions and the like.

The amount of the active drug in such preparations is not particularly critical and can vary with the dosage desired and pharmaceutical compounding procedures. Generally, the active drug comprises from about 1 to about 90 percent by weight of the total composition. In the compounding of oral dosage form it is preferred to utilize about 40 to about 90 percent by weight active drug and most preferred to utilize from about 55 to about 85 percent by weight active drug based on the weight of the total composition. Preferred dosage forms for oral administration are tablets containing 250 mg. or 500 mg. of active ingredient or the equivalent amount of a pharmaceutically acceptable salt thereof. Generally, for adults a daily dosage of active ingredient in the range of from about 1 to about 4 grams is utilized.

The following examples are illustrative. In these examples, the substituted acridanones of the present invention were tested for activity against Columbia SK and herpes viruses by the following technique: A group of albino mice weighing 9 to 12 grams each was treated intraperitoneally with the compound being tested. Twenty-four hours after this treatment the treated mice and an untreated control group of mice were infected intraperitoneally with approximately 10 times the $LD_{50}$ of either Columbia SK or herpes virus from mouse brain homogenate pools. The treated group was given a second treatment immediately after infection and again 24 hours after the infection. The treated and untreated mice were then observed daily for symptoms and the number of survivors recorded after 21 days. The results of these tests are reported in the examples in the form of $CD_{50}$ values, as determined by the method of Reed and Muench [Am. Jour. Hygiene 27, 493 (1938)]. Other groups of adult mice weighing 18–20 g. were infected intraperitoneally with Coxsackie virus B1 obtained from Rhesus monkey kidney cell culture pools. These mice were treated in the same manner as described above.

In the examples, all melting points were determined microscopically on a hot stage and are corrected. The UV spectra were determined in 2-propanol on a Cary Model 14 spectrophotometer, nmr spectra with a Varian A–60 instrument and ir spectra on a Beckman IR–9 spectrophotometer. All spectra were compared in order to confirm or exclude the expected changes. All temperatures are in degrees centigrade.

EXAMPLE 1

A mixture of 10.3 g. (0.03 M.) of 2-amino-2'-fluoro-5-iodobenzophenone, 4.15 g (0.03 M) of potassium carbonate and 40 ml. of N,N-dimethylformamide was heated under reflux with stirring for 27 hours. The solvent was then removed under reduced pressure and the product crystallized from a mixture of dimethylformamide, methanol and water to yield 2-iodo-9-acridone as yellow prisms, mp > 350°.

Prepared in a similar manner were 9-acridone mp 354° and 2-chloro-9-acridone, mp > 350°.

EXAMPLE 2

A solution of 13 g (0.0565 M) of 2-chloro-9-acridone in 110 ml. of dry N,N-dimethylformamide under nitrogen was treated with 3.2 g (0.0678 M) of a 50 percent dispersion of sodium hydride in mineral oil. After 30 minutes, 14.2 g (0.0848 M) of ethyl bromoacetate was added dropwise with stirring to the cold (5°) solution, and the reaction mixture stirred at room temperature for 18 hours. The reaction mixture was warmed to 50° for 1 hour and then poured onto ice. The resulting precipitate was filtered and recrystallized from a mixture of chloroform and ethanol and then from a mixture of dichloromethane and methanol to yield 10-ethoxyacetyl-2-chloro-9-acridanone as yellow needles, mp 165°–168°.

In a similar manner 10-ethoxyacetyl-9-acridanone was prepared and recrystallized from dichloromethane and ethyl ether to yield yellow needles mp 180°–181°.

Also prepared by the same manner was (7-chloro-9-oxo-10-acridanyl) acetic acid, methyl ester which was recrystallized from dichloromethane and methanol as orange prisms having a mp 208°–218°.

EXAMPLE 3

A solution of 11.5 g (0.05 M) of 2-chloro-9-acridanone in 150 ml. of dry N,N-dimethylformamide under nitrogen was treated with 3.4 g (0.07 M) of a 50 percent dispersion of sodium hydride in mineral oil, stirred for 30 minutes at room temperature and treated with 19 g (0.079 M) of γ-iodobutyric acid ethyl ester with stirring. The mixture was heated at 80° for 2 hours and then poured into water, filtered and the precipitate washed with and recrystallized from a mixture of ethanol and water to yield 4-(2-chloro-9-oxo-10-acridanyl)-butyric acid ethyl ester as yellow needles, mp 115°–116°.

In a similar manner the following compounds were prepared: 5-(2-chloro-9-oxo-10-acridanyl)acetic acid, ethyl ester, recrystallized from dichloromethane and ethanol, mp 136°–139°; 2-(7-nitro-9-oxo-10-acridanyl)acetic acid, ethyl ester, recrystallized from acetone as yellow crystals, mp 202°–203°; and 2-(7-chloro-1-fluoro-9-oxo-10-acridanyl)acetic acid, ethyl ester, recrystallized from a mixture of dichloromethane and alcohol as yellow prisms mp 204°–207°.

EXAMPLE 4

A mixture of 15.2 g of 10-ethoxyacetyl-2-chloro-9-acridanone, 300 ml. of methanol, 100 ml. of water and 100 ml. (0.3 M) of 3N sodium hydroxide was stirred for 18 hours at room temperature, and the methanol was removed under reduced pressure. The solution was extracted with 200 ml. of dichloromethane, filtered and the precipitate added to the basic layer which was then warmed to 80° and filtered. The filtrates were acidified with acetic acid, and filtered. The precipitate was collected, crystallized from methanol and recrystallized from a mixture of ethanol and chloroform to give 10-(carboxymethyl)-2-chloro-9-acridanone as orange prisms, mp 250°–270° (reset to needles), mp. 335°–345° decomp.

The product, 10-(carboxymethyl)-2-chloro-9-acridanone, when tested against Columbia SK, herpes and Coxsackie B1 viruses was found to be very active, having $CD_{50}$ values of 66, 31 and 19 mg./kg., i.p., respectively. The compound has an $LD_{50}$ of 250 mg./kg., i.p.

EXAMPLE 5

In a manner analogous to Example 4, 10-(carboxymethyl)-9-acridanone was prepared from 9-acridanone as yellow needles having a mp of 294°–296°.

10-(Carboxymethyl)-9-acridanone tested against Columbia SK, herpes and Coxsackie B1 viruses was found to be very active, having $CD_{50}$ values of 104, 62 and 18 mg./kg., i.p., respectively. The compound has an $LD_{50}$ of 7500 mg./kg., i.p.

EXAMPLE 6

In a manner similar to Example 4, 10-(carboxymethyl)-2-nitro-9-acridanone was prepared and recrystallized from a mixture of water and ethanol as yellow crystals having a mp of 282°–283°. Also prepared was 2-chloro-9-oxo-10-acridanvaleric acid which was recrystallized from methanol as yellow crystals having a mp of 230°–237°.

EXAMPLE 7

A solution of 1 g (0.029 M) of 4-(2-chloro-9-oxoacridanyl)-butyric acid ethyl ester in 25 ml. (0.075 M) of 3N sodium hydroxide and 50 ml. of ethanol was warmed on the steam bath for 45 min. and then evaporated to dryness. The residue was dissolved in 25 mg. of water, acidified with acetic acid and filtered. The precipitate was recrystallized from a mixture of ethanol and water to give 2-chloro-9-oxo-10-acridanbutyric acid as yellow needles, mp 255°–256°.

The product, 2-chloro-9-oxo-10-acridanbutyric acid, when tested against Columbia SK, herpes and Coxsackie B1 viruses was found to have $CD_{50}$ values of > 100, > 100 and 100 mg./kg., i.p., respectively. The compound has an $LD_{50}$ of >500 mg./kg., i.p.

EXAMPLE 8

A solution of 14 g (0.0486 M) of 10-(carboxymethyl)-2-chloro-9-acridanone in 80 ml. of N,N-dimethylformamide was treated with 15 g (0.125 M) of thionyl chloride, and after 10 minutes the excess reagent was removed under reduced pressure. The mixture was cooled (5°) and a solution of ammonia in 25 ml. of N,N-dimethylformamide was added slowly with stirring. Ammonia was bubbled in the reaction mixture for 10 minutes, and after standing for 30 minutes at room temperature, the solution was poured into 1 liter of cold water, and filtered. The precipitate was refluxed in methanol for a few minutes, cooled and filtered. The product was recrystallized from a mixture of N,N-dimethylformamide and water to give 2-(2-chloro-9-oxo-acridanyl)acetamide as yellow prisms, mp 315°–321° decomp.

The product was tested against Columbia SK, herpes and Coxsackie B1 viruses and was found to have $CD_{50}$ values of > 250, > 250 and 200 mg./kg., i.p., respectively. 2-(2-chloro-9-oxoacridanyl)acetamide has a $LD_{50}$ of > 500 mg./kg., i.p.

EXAMPLE 9

In an analogous manner to Example 8, 2-chloro-9-oxo-10-acridanyl-N-methylacetamide was prepared and recrystallized from a mixture of N,N-dimethylformamide and methanol as orange crystals having a mp of 331°–335° decomp. Also prepared, in a similar manner, was 2-chloro-9-oxo-10-acridanyl-N,N-dimethylacetamide which was recrystallized from a mixture of N,N-dimethylformamide and water as yellow crystals having a mp of 315°–321° decomp.

EXAMPLE 10 a. Parenteral

In a clean glass or glass-lined vessel 8,000 cc. of water for injection were heated to 90°. The mixture was then cooled to 50°–60° and 18 g of methylparabin and 2 g of propylparabin were added and dissolved with stirring. The solution was then allowed to cool to room temperature. To the resulting solution under stirring was added 510 g of 10-(carboxymethyl)-2-chloro-9-acridanone and sufficient amount of a 10 percent by weight solution of sodium hydroxide in water for injection to bring the pH at 9.0 plus or minus 0.1. Stirring was continued until the 10-(carboxymethyl)-2-chloro-9-acridanone was completely dissolved. The solution was then brought to a final volume of 10,000 cc. with water for injection. The solution was filtered through an 0.2 Selas candle, filled into suitable size ampuls, gassed with nitrogen and sealed. The ampuls were autoclaved at 10 psi for 30 minutes. The final preparations contain in each cubic centimeter 51 mg. of 10-(carboxymethyl)-2-chloro-9-acridanone (2 percent excess).

b. Tablet

Two hundred and fifty parts by weight 10-(carboxymethyl)-2-chloro-9-acridanone, 70 parts by weight corn starch, 25 parts by weight of a commercial hydrogenated coconut oil, 3 parts by weight calcium stearate and 235 parts by weight dicalcium phosphate dihydrate, unmilled, were thoroughly mixed in a suitable mixer. The mixture was further blended by passing through a Fitzpatrick Comminuting machine fitted with a No. 1A screen, knives forward. The mix was then compressed into tablets having an average weight per tablet of 583 mg. Each such tablet contained 250 mg. of active ingredient.

c. Tablet

Five hundred parts by weight 10-(carboxymethyl)-2-chloro-9-acridanone were thoroughly mixed in a suitable mixer with 88 parts by weight lactose and 30 parts by weight corn starch. The mixture was thereafter granulated with 12 parts by weight gelatin as a 10 percent by weight aqueous solution. The moist mass was passed through a No. 12 screen and the resulting granules were dried on paper-lined trays overnight. The dried granules were passed through a No. 14 screen and returned to the mixer. Five parts by weight magnesium stearate and 15 parts by weight talc were added and the whole thoroughly mixed. The mixture was then compressed into tablets having an average weight of 650 mg., an approximate diameter of 12.7 mm. (one-half inch) and a thickness of about 5.1 mm. Each such tablet contained 500 mg. of active ingredient.

d. Capsule

Two hundred and fifty parts by weight 10-(carboxymethyl)-2-chloro-9-acridanone, 50 parts by weight lactose, 45 parts by weight corn starch and 5 parts by weight magnesium stearate were mixed until thoroughly blended in a suitable size mixer. The mixture was further blended by passing through a Fitzpatrick Comminuting machine fitted with a No. 1A screen, knives forward. The blended powder was then filled into No. 2, two piece, hard-shell gelatin capsules on a suitable commercial capsulating machine. Each such capsule contained a total filled weight of approximately 350 mg. and 250 mg. active drug.

Similarly, formulations may be produced containing the other active compounds of the invention by substituting such compounds for 10-(carboxymethyl)-2-chloro-9-acridanone.

We claim:

1. A compound represented by the formula

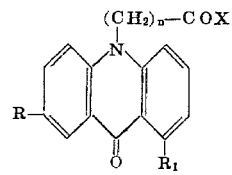

wherein R is selected from the group consisting of hydrogen, halogen and nitro, $R_1$ is hydrogen or halogen and X is selected from the group consisting of $OR_2$ and $-NR_3R_4$ wherein each of $R_2$, $R_3$ and $R_4$ is hydrogen or lower alkyl, and $n$ is 1 to 4 and where X is hydroxy, pharmaceutically acceptable salts thereof.

2. A compound in accordance with claim 1 wherein R is selected from the group consisting of hydrogen and chloro, $R_1$ is hydrogen, X is selected from the group consisting of hydroxy and amino and $n$ is 1 to 3 and, where X is hydroxy, pharmaceutically acceptable salts thereof.

3. A compound in accordance with claim 2 wherein R is chloro, $R_1$ is hydrogen, X is hydroxy and $n$ is 1, i.e., 10-(carboxymethyl)--chloro-9-acridanone.

4. A compound in accordance with claim 2 wherein R is hydroxy, $R_1$ is hydrogen, X is hydroxy and $n$ is 1, i.e., 10-carboxymethyl-9-acridanone.

5. A compound in accordance with claim 2 wherein R is chloro, $R_1$ is hydrogen, X is hydroxy and $n$ is 3, i.e., 2-chloro-9-oxo-10-acridanbutyric acid.

6. A compound in accordance with claim 2 wherein R is chloro, $R_1$ is hydrogen, X is amino and $n$ is 1, i.e., 2-(2-chloro-9-oxoacridanyl)acetamide.

* * * * *